Dec. 16, 1958     C W. MUSSER     2,864,634
TELESCOPE MOUNT

Filed Feb. 28, 1958     2 Sheets-Sheet 1

INVENTOR
C WALTON MUSSER
BY
W. E. Thibodeau, J. J. Lynch & H. R. Johns

Dec. 16, 1958     C W. MUSSER     2,864,634
TELESCOPE MOUNT

Filed Feb. 28, 1958     2 Sheets-Sheet 2

INVENTOR
C WALTON MUSSER

United States Patent Office 2,864,634
Patented Dec. 16, 1958

1

2,864,634

TELESCOPE MOUNT

C Walton Musser, Beverly, Mass., assignor to the United States of America as represented by the Secretary of the Army Application February 28, 1958, Serial No. 718,385

4 Claims. (Cl. 287—117)

(Granted under Title 35, U. S. Code (1952), sec. 266)

The invention described herein may be manufactured and used by or for the Government for governmental purposes without the payment of any royalty thereon.

This invention relates to telescope mounts of the type wherein two tapered surfaces are forced together to center the telescope.

In the use of such mounts it is sometimes found that the telescope sticks in its support and must be subjected to a sharp rap in order to jar it loose. In accordance with this invention, this difficulty is avoided by the provision of a pair of keys longitudinally movable between the telescope and its support to force the telescope into and out of the support.

The invention will be better understood from the following description considered in connection with the accompanying drawings and its scope is indicated by the appended claims.

Referring to the drawings.

Figure 1:
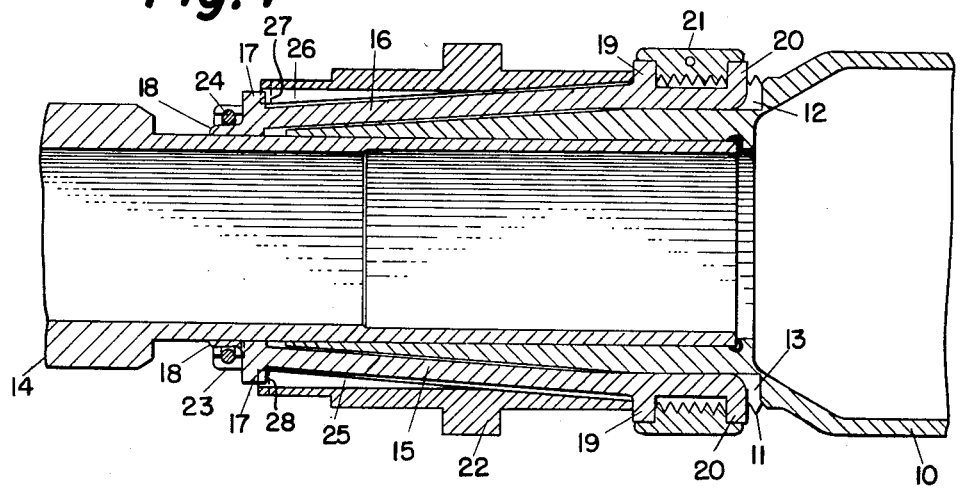
Fig. 1 is a sectional view of the telescope mount and the support.
Figure 2:
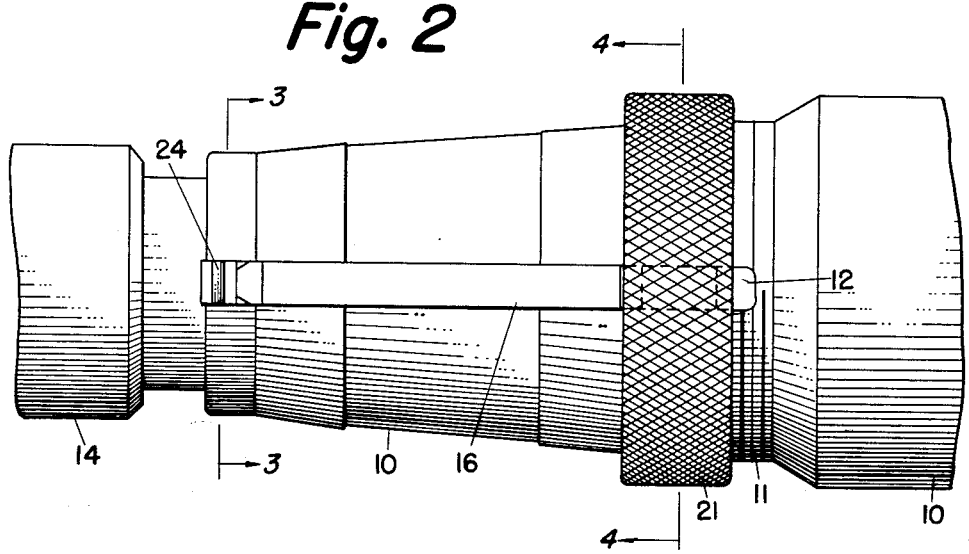
Fig. 2 is an outside view of the telescope mount.
Figure 3:
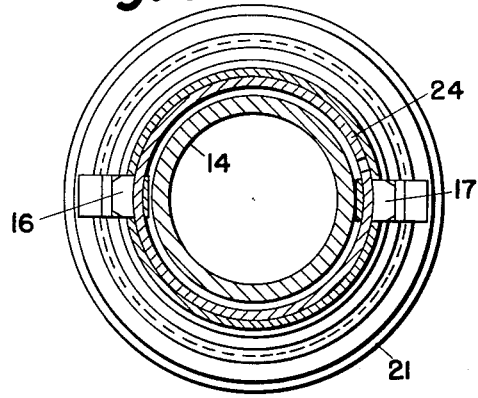
Fig. 3 is a section taken on the line 3—3 of Fig. 2.
Figure 4:
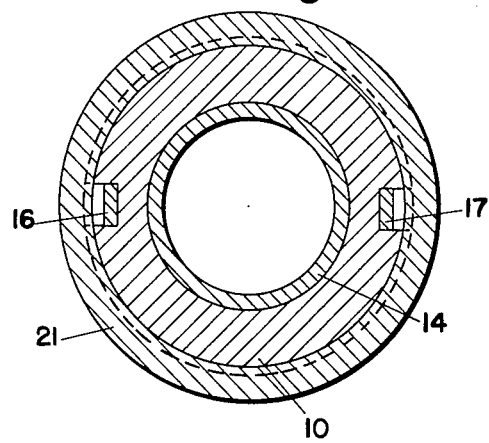
Fig. 4 is a section taken on the line 4—4 of Fig. 2.

The illustrated mount includes an adapter 10 which has a thread 11, has diametrically opposed slots 12 and 13, and is brazed or otherwise fixed to a tube 14. Resting in the slots 12 and 13 are keys 15 and 16 which rotate with the adapter 10 and function to force the adapter into and out of a support 22 which has longitudinal keyways 25 and 26. These keyways are so dimensioned as to pass the outwardly extending flanges 17 at the left hand ends of the keys 15 and 16. Circumferential slots 27 and 28 in the end of the support 22 communicate with the slots 25 and 26 and extend through an angle of approximately 90 degrees.

Each of the keys 16 and 15 has at one end spaced-apart flanges 19 and 20 and at the other a single flange 17 and an extension 18 which is arranged to cooperate with an extension 23 of the adapter 10 for securing a ring 24. The ring 24 functions to retain the keys 15 and 16 in their respective slots when a collar 21 is screwed off the thread 11. The collar 21 is mounted between the flanges 19 and 20 and has an inner thread which is arranged to engage the thread 11 of the adapter 10.

Figure 5:
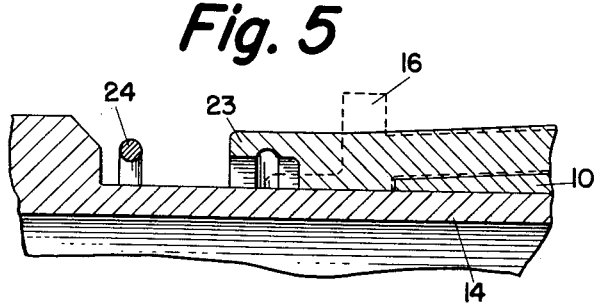
Fig. 5 is an explanatory diagram relating to the insertion of a retaining ring for holding the parts of the mount together.

Fig. 5 indicates how the keys 16 and 15 are positioned to permit insertion of the retaining ring 24 into the slot of the extension 23.

Assembly of the above described mount is effected by inserting the telescope into the tapered hole of the support, pushing the keys 15 and 16 through the keyways 25

2 and 26, turning the telescope until the flanges 17 reach the ends of the circumferential slots 27 and 28, and tightening the knurled locking nut 21.

Disassembly of the mount involves turning the collar 21 in the oposite direction. This moves the keys into contact with the locking nut side of the support. Continued turning of the nut forces the telescope to break loose from the tapered hole since the nut and keys are constrained from further axial movement by the mount. The mechanical advantage of this screw jack arrangement for disassembly is of the order of 100 to 1. After the telescope becomes loose in the tapered hole, it is turned 90 degrees to a stop and removed from the support.

I claim:

1. The combination of inner and outer members having matching tapered surfaces, said inner member having a thread near the larger end of its tapered surface and having a plurality of slots, a plurality of keys each mounted in a different one of said slots with a pair of spaced-apart flanges near one end of said outer member and a single flange at the other end of said outer member, and a collar mounted between said spaced-apart flanges and having an inner thread arranged to cooperate with the thread of said inner member for forcing it into and out of said outer member.

2. The combination of inner and outer members having matching tapered surfaces, said inner member having a thread near the larger end of its tapered surface and having a plurality of slots, a plurality of keys each mounted in a different one of said slots with a pair of spaced-apart flanges near one end of said outer member and a single flange at the other end of said outer member, a collar mounted between said spaced-apart flanges and having an inner thread arranged to cooperate with the thread of said inner member for forcing it into and out of said outer member, and means for retaining said keys in said slots when said threads are disengaged.

3. The combination of inner and outer members having matching tapered surfaces, said inner member having a thread near the larger end of its tapered surface and having a plurality of slots, a plurality of keys each mounted in a different one of said slots with a pair of spaced-apart flanges near one end of said outer member and a single flange at the other end of said outer member, a collar mounted between said spaced-apart flanges and having an inner thread arranged to cooperate with the thread of said inner member for forcing it into and out of said outer member and a retaining ring interposed between said inner member and said keys.

4. The combination of a support having a tapered inner surface, a member tapered to match the tapered surface of said support and threaded at its larger end, said member having diametrically opposed slots, keys each disposed in a different one of said slots with spaced-apart flanges at one end and with a single flange and an extension at the other end, a collar mounted between said spaced-apart flanges and having an inner thread arranged to engage the thread of said tapered member, and a retaining ring interposed between said extension and said tapered member.

References Cited in the file of this patent

UNITED STATES PATENTS

| 50,190 | Watson | Sept. 26, 1865 |
| 1,631,250 | Daniel | June 7, 1927 |
| 1,900,366 | Riebel et al. | Mar. 7, 1933 |